United States Patent Office 3,366,698
Patented Jan. 30, 1968

3,366,698
**PROCESS FOR THE PRODUCTION OF
2,4-DICHLOROTOLUENE**
Eugene P. Di Bella, Rochelle Park, N.J., assignor to Tenneco Chemicals, Inc., a corporation of Delaware
No Drawing. Filed Aug. 19, 1965, Ser. No. 481,101
2 Claims. (Cl. 260—650)

This invention relates to a process for the production of dichlorotoluenes. More particularly, it relates to a process for the chlorination of para-chlorotoluene whereby there is formed a mixture of dichlorotoluene isomers of unusually high 2,4-dichlorotoluene content.

In recent years there has been an increased demand for 2,4-dichlorotoluene, which is widely used as a high-boiling solvent and as an intermediate in the preparation of pharmaceuticals, dyestuffs, rubber chemicals, and other organic compounds. 2,4-dichlorotoluene has in the past been produced by chlorinating toluene or para-chlorotoluene in the presence of iron or another known nuclear chlorination catalyst to form a chlorotoluene product that contains in addition to 2,4-dichlorotoluene substantial amounts of the less desirable dichlorotoluene isomers, 3,4-dichlorotoluene and 2,5-dichlorotoluene, and of trichlorotoluenes.

It is an object of this invention to provide a process for the production of dichlorotoluene that contains at least 80 percent of 2,4-dichlorotoluene. It is a further object to provide a process for the production of substantially pure 2,4-dichlorotoluene. Other objects will be apparent from the detailed description of the invention that follows.

The objects of this invention may be accomplished by reacting para-chlorotoluene with chlorine in the presence of zirconium tetrachloride as a chlorination catalyst. The chlorotoluene product obtained contains a substantially larger amount of 2,4-dichlorotoluene than is obtained when para-chlorotoluene is chlorinated in the presence of the previously-known nuclear-chlorination catalysts.

The process of the present invention may be carried out by contacting para-chlorotoluene with chlorine in the presence of a catalytic amount of a chlorination catalyst that comprises zirconium tetrachloride until the reaction product is a mixture of chlorotoluenes containing an average of about 1.5 to about 2.0 gram atoms of chlorine per mole. This mixture may be fractionally distilled to separate the dichlorotoluenes from unreacted para-chlorotoluene and any trichlorotoluenes that may be present. The dichlorotoluene fraction, which contains at least 80 percent of the 2,4-dichloro isomer, may be fractionally distilled to yield substantially pure 2,4-dichlorotoluene.

Only a small amount of zirconium tetrachloride need be present in the reaction mixture to increase the relative amount of 2,4-dichlorotoluene that is formed. As little as about 0.05 percent of zirconium tetrachloride based on the weight of para-chlorotoluene will bring about an increase in the 2,4-dichlorotoluene content of the chlorination product. There appears to be no advantage in using more than about 3 percent of the catalyst. In most cases about 0.5 percent to 1.5 percent of zirconium tetrachloride based on the weight of para-chlorotoluene is used.

While zirconium tetrachloride is ordinarily and preferably used as the sole chlorination catalyst in the chlorination of para-chlorotoluene, it may be used in combination with another nuclear chlorination catalyst, such as iron or ferric chloride. The chlorination may, for example, be carried out by adding a mixture of zirconium tetrachloride and iron or other chlorination catalyst to the reaction mixture or by carrying out the chlorination of para-chlorotoluene in the presence of zirconium tetrachloride in an iron vessel. The zirconium tetrachloride has been found to be effective in promoting the formation of 2,4-dichlorotoluene in the presence of as much as five times its weight of added iron (21:1 mole ratio of iron to zirconium tetrachloride), probably because the zirconium tetrachloride-catalyzed chlorination takes place far more rapidly than does the iron-catalyzed reaction.

The chlorination of para-chlorotoluene may be carried out by procedures that are well known in the art. For example, chlorine may be added to a reaction mixture containing toluene and the chlorination catalyst until the increase in the weight of the reaction mixture or in its specific gravity indicates that the desired amount of chlorine has reacted with the para-chlorotoluene. In the practice of the present invention, the chlorination is usually continued until the reaction mixture contains an average of about 1.5 to about 2.0 gram atoms of chlorine per mole. This mixture generally contains about 60 to 80 percent of dichlorotoluene, 15 to 30 percent of unreacted para-chlorotoluene, and 0 to 5 percent of trichlorotoluenes. The dichlorotoluene fraction, which may be separated from the para-chlorotoluene and trichlorotoluenes by fractional distillation or other known technique, contains at least 80 percent of 2,4-dichlorotoluene, the remainder being 3,4-dichlorotoluene. 2,4-dichlorotoluene may be readily separated by fractional distillation.

The chlorination reaction may be carried out at temperatures in the range of about $-5°$ C. to $60°$ C., with $10°$ C. to $30°$ C. the preferred temperature range. Below about $-5°$ C., the reaction takes place too slowly to be of commercial interest. At temperatures above $60°$ C., there is a tendency for side-chain chlorinated by-products to form. Since chlorination is an exothermic reaction, external cooling may be required to maintain the reaction temperature in the desired range.

The rate at which chlorine is added to the reaction mixture does not have an appreciable effect on the yield of dichlorotoluene or on the isomer distribution in the product.

The invention is further illustrated by the examples that follow.

*Example 1*

A mixture of 252 grams (2 moles) of para-chlorotoluene and a chlorination catalyst in a glass chlorination vessel was chlorinated by passing a stream of gaseous chlorine over its surface at the rate of about 75 grams per hour until a weight increase of 69 grams (ca. 1 gram of chlorine per mole of para-chlorotoluene) was attained. During the chlorination the reaction mixture was stirred, and external cooling was used to maintain the reaction temperature in the range of $25°–30°$ C. Vapor phase chromatographic analysis indicated that the reaction mixtures contained about 72–78 percent of dichlorotoluene and smaller amounts of para-chlorotoluene and trichlorotoluene. The mixtures were distilled to separate a dichlorotoluene fraction, which was then fractionally distilled to yield substantially pure 2,4-dichlorotoluene. The chlorination catalysts used and the 2,4-dichlorotoluene contents of the corresponding dichlorotoluene fractions are set forth in Table I.

TABLE I.—CHLORINATION OF PARA-CHLOROTOLUENE

| Catalyst (percent based on weight of para-chlorotoluene). | | Percent 2,4-dichlorotoluene in dichlorotoluene fraction |
|---|---|---|
| Iron powder | Zirconium tetrachloride | |
| 0.0 | 0.8 | 85.1 |
| 0.08 | 0.8 | 82.7 |
| 0.8 | 0.8 | 81.7 |
| 4.0 | 0.8 | 81.5 |
| 0.8 | 0 | 75.6 |

Example 2

A series of chlorinations was carried out in which para-chlorotoluene was chlorinated in an iron vessel at 25° C. until the reaction mixture contained an average of 1.55 to 1.70 gram atoms of chlorine per mole. The chlorination catalysts employed and the analysis of the reaction products are set forth in Table II.

TABLE II

| Catalyst | Degree of chlorination (gram atoms of Cl/mole) | Analysis of product | | | | Percent 2,4-dichlorotoluene in dichlorotoluene fraction |
|---|---|---|---|---|---|---|
| | | Mono Cl | 2,4- DiCl | 3,4- DiCl | Tri Cl | |
| ZrCl₄ | 1.55 | 31.5 | 51.9 | 11.8 | 4.8 | 81.7 |
| ZrCl₄ | 1.65 | 33.0 | 49.9 | 11.6 | 5.5 | 81.4 |
| ZrCl₄ | 1.67 | 30.7 | 53.4 | 11.2 | 4.7 | 82.5 |
| Iron powder | 1.68 | 30.6 | 50.9 | 13.9 | 4.6 | 78.2 |
| Do | 1.69 | 29.1 | 52.1 | 13.9 | 4.9 | 77.0 |

From the data in Tables I and II it will be seen that the use of zirconium tetrachloride as the chlorination catalyst even in the presence of iron resulted in a 5 to 10 percent relative increase in the formation of 2,4-dichlorotoluene over that obtained when iron is used as the sole chlorination catalyst.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:
1. The process for the production of dichlorotoluene containing at least 80 percent of 2,4-dichlorotoluene which comprises contacting para-chlorotoluene with chlorine in the presence of a catalyst consisting essentially of zirconium tetrachloride and iron to form a mixture of chlorotoluenes containing an average of about 1.5 to 2.0 gram atoms of chlorine per mole and thereafter separating from said mixture a dichlorotoluene fraction containing at least 80 percent of 2,4-dichlorotoluene.

2. The process for the production of 2,4-dichlorotoluene which comprises the steps of contacting para-chlorotoluene with chlorine in the presence of a chlorination catalyst that comprises zirconium tetrachloride and iron to form a mixture of chlorotoluenes containing an average of about 1.5 to 2.0 gram atoms of chlorine per mole, separating from said mixture a dichlorotoluene fraction containing at least 80 percent of 2,4-dichlorotoluene, and thereafter fractionally distilling said dichlorotoluene fraction to obtain substantially pure 2,4-dichlorotoluene.

References Cited
UNITED STATES PATENTS 3,000,975    9/1961    Di Bella et al.    260—650
3,214,482    10/1965    Caropreso et al.    260—650

BERNARD HELFIN, *Acting Primary Examiner.*

LEON ZITVER, *Examiner.*

N. J. KING, H. T. MARS, *Assistant Examiners.*